(12) United States Patent
Huang et al.

(10) Patent No.: US 8,898,034 B2
(45) Date of Patent: Nov. 25, 2014

(54) AUTOMATICALLY IDENTIFYING GEOGRAPHIC DIRECTION

(75) Inventors: Ronald Keryuan Huang, Milpitas, CA (US); Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 234 days.

(21) Appl. No.: 12/477,865

(22) Filed: Jun. 3, 2009

(65) Prior Publication Data
US 2010/0312519 A1 Dec. 9, 2010

(51) Int. Cl.
| G01C 9/00 | (2006.01) |
| G01C 17/00 | (2006.01) |
| G01C 19/00 | (2013.01) |
| G01C 17/28 | (2006.01) |
| G01C 17/38 | (2006.01) |

(52) U.S. Cl.
CPC ............... *G01C 17/28* (2013.01); *G01C 17/38* (2013.01)
USPC ......................................... 702/150; 701/525

(58) Field of Classification Search
USPC ......................................... 702/150; 701/525
See application file for complete search history.

(56) References Cited

U.S. PATENT DOCUMENTS

| | | | |
|---|---|---|---|
| 5,075,693 A * | 12/1991 | McMillan et al. ............ 342/457 |
| 5,165,269 A | 11/1992 | Nguyen |
| 5,349,529 A | 9/1994 | Masumoto et al. |
| 5,761,094 A | 6/1998 | Olson et al. |
| 5,946,813 A | 9/1999 | Nachbaur et al. |
| 6,311,129 B1 | 10/2001 | Lin |
| 6,384,384 B1 | 5/2002 | Connolly et al. |
| 6,408,245 B1 | 6/2002 | An et al. |
| 6,424,914 B1 | 7/2002 | Lin |
| 6,508,316 B2 | 1/2003 | Estes et al. |
| 6,539,639 B2 | 4/2003 | Smith |
| 6,622,091 B2 | 9/2003 | Perlmutter et al. |
| 6,651,003 B2 | 11/2003 | Woloszyk et al. |
| 6,768,452 B2 | 7/2004 | Gilkes |
| 6,807,485 B1 | 10/2004 | Green |
| 6,964,107 B1 | 11/2005 | Ahola |
| 6,988,049 B1 | 1/2006 | Wirtz et al. |
| 7,196,660 B2 | 3/2007 | Abraham |
| 7,210,236 B2 | 5/2007 | Sato et al. |

(Continued)

FOREIGN PATENT DOCUMENTS

| EP | 1 221 586 | 7/2002 |
| JP | 2005-134343 | 5/2005 |
| WO | WO 2008/122904 | 10/2008 |
| WO | WO 2009/068116 | 6/2009 |

OTHER PUBLICATIONS

Piemonte, et al., "Dynamic Compass Calibration in a Portable Device", U.S. Appl. No. 12/479,203, filed Jun. 5, 2009.

(Continued)

*Primary Examiner* — John Breene
*Assistant Examiner* — Manuel Rivera Vargas
(74) *Attorney, Agent, or Firm* — Fish & Richardson P.C.

(57) ABSTRACT

Automatically identifying a geographic direction (e.g., a heading relative to true north) is disclosed. Responsive to a correction trigger event, geographic position data that identifies a geographic position of the device can be obtained. A magnetic declination based on the geographic position data can be obtained. A magnetic heading of the device can be obtained. A geographic direction based on the magnetic heading and the magnetic declination can be identified without user intervention.

21 Claims, 7 Drawing Sheets

(56) References Cited

U.S. PATENT DOCUMENTS

| | | | |
|---|---|---|---|
| 7,248,983 B2 | 7/2007 | Fillatreau et al. | |
| 7,275,008 B2 | 9/2007 | Plyvanainen | |
| 7,324,906 B2 | 1/2008 | Sato et al. | |
| 7,331,115 B2 | 2/2008 | Schierbeek et al. | |
| 7,346,452 B2 | 3/2008 | Ford et al. | |
| 7,388,541 B1 | 6/2008 | Yang | |
| 7,391,366 B2 | 6/2008 | Park et al. | |
| 7,400,974 B2 | 7/2008 | Fuchs et al. | |
| 7,415,354 B2 | 8/2008 | Alexander | |
| 7,451,549 B1 | 11/2008 | Sodhi et al. | |
| 7,458,166 B2 | 12/2008 | Parks et al. | |
| 7,548,200 B2 | 6/2009 | Garin | |
| 7,565,839 B2 | 7/2009 | Stewart et al. | |
| 7,631,119 B2 | 12/2009 | Moore | |
| 8,061,049 B2 | 11/2011 | Mayor et al. | |
| 2003/0135327 A1 | 7/2003 | Levine et al. | |
| 2005/0174324 A1 | 8/2005 | Liberty et al. | |
| 2005/0223575 A1 | 10/2005 | Fillatreau et al. | |
| 2005/0240347 A1 | 10/2005 | Yang | |
| 2005/0246099 A1* | 11/2005 | Jendbro et al. | 701/216 |
| 2006/0066295 A1 | 3/2006 | Tamura et al. | |
| 2006/0190174 A1 | 8/2006 | Li et al. | |
| 2006/0195254 A1 | 8/2006 | Ladetto et al. | |
| 2006/0271295 A1 | 11/2006 | McLaren et al. | |
| 2007/0103461 A1* | 5/2007 | Suzuno et al. | 345/419 |
| 2007/0156337 A1* | 7/2007 | Yanni | 701/213 |
| 2008/0066331 A1 | 3/2008 | Brzezinski et al. | |
| 2008/0143595 A1 | 6/2008 | Colley et al. | |
| 2008/0147686 A1 | 6/2008 | Colley et al. | |
| 2008/0201096 A1 | 8/2008 | Wright et al. | |
| 2009/0033807 A1 | 2/2009 | Sheng et al. | |
| 2009/0054075 A1 | 2/2009 | Boejer | |
| 2009/0070058 A1 | 3/2009 | Lin | |
| 2009/0089001 A1 | 4/2009 | Lin | |
| 2009/0171607 A1 | 7/2009 | Chen et al. | |
| 2009/0172599 A1* | 7/2009 | Nezu | 715/841 |
| 2009/0326851 A1 | 12/2009 | Tanenhaus | |
| 2010/0121599 A1 | 5/2010 | Boeve et al. | |
| 2010/0188276 A1* | 7/2010 | Griffith et al. | 341/141 |
| 2010/0305853 A1* | 12/2010 | Schulze et al. | 701/212 |
| 2011/0106474 A1 | 5/2011 | Kulik et al. | |

OTHER PUBLICATIONS

Mayor et al., "Accuracy Indications for an Electronic Compass in a Portable Device", U.S. Appl. No. 12/479,196, filed Jun. 5, 2009.
Seong Yun Cho et al., "A Calibration Technique for a Two-Axis Magnetic Compass in Telematics Devices", Jun. 2005, ETRI Journal, vol. 27, No. 3, pp. 280-288.
Chris M. Goulet, "Magenetic Declination, Frequently Asked Questions", Oct. 2001, Version 4.4, [retrieved on May 16, 2009]. Retrieved from the Internet: <URL: http://www.geocities.com/magnetic_declination/>, 16 pp.
PNI Sensor Corporation, "Calibration Computations for Practical Compassing using the PNI-11096 Magnetometer ASIC", Aug. 2008, PNI Corporation © 2001, Santa Rosa, CA, 3 pp.
PNI Sensor Corporation, "Multipoint Calibration Primer", PNI Corporation, Santa Rosa, CA, 10 pp.
An Overview of the Earth's Magnetic Field, "The Earth's Magnetic Field—An Overview", [retrieved on May 16, 2009]. Retrieved from the Internet: <URL: http://www.geomag.bgs.ac.uk/earthmag.html>, 10 pp.
The Earth's magnetic field, EPS 122: Lecture 5—Earth's magnetic field, 11 pp.
Apptism, iTopoMaps, © 2009 Apptism, [retrieved on Jun. 2, 2009]. Retrieved from the Internet: <URL: http://www.apptism.com/apps/itopomaps>, 4 pp.
Apptism, Compass Go, © 2009 Apptism, [retrieved on Jun. 3, 2009]. Retrieved from the Internet: <URL: http://www.apptism.com/apps/compass-go>, 2 pp.
Apptism, Focalware, © 2009 Apptism, [retrieved on Jun. 3, 2009]. Retrieved from the Internet: <URL: http://www.apptism.com/apps/focalware>, 2 pp.
Harper et al., "Process for Improving GPS acquisition assistance data and server-side location determination for cellular networks," 2004 Intl Symp on GNSS/GPS, Dec. 6-8, 2004, Sydney, Australia, 15 pages.
Mayor et al., "Restoring and Storing Magnetometer Calibration Data", U.S. Appl. No. 12/479,483, filed Jun. 5, 2009.
Mayor et al., "Magnetometer Accuracy and Use", U.S. Appl. No. 12/479,717, filed Jun. 5, 2009.
Mayor et al., "Context Determination to Assist Location Determination Accuracy", U.S. Appl. No. 12/549,250, filed Aug. 27, 2009.
Adiprawita et al., "Development of AHRS (Attitude and Heading Reference System) for Autonomous UAV (Unmanned Aerial Vehicle)," *Proc Int'l Conf Electrical Engineering and Informatics*, Institut Teknologi Bandung, Indonesia, Jun. 17-19, 2004, 4 pages.
Zhang and Gao, "A Novel Auto-calibration Method of the Vector Magnetometer," Ninth Intl Conf on Electronic Measurement & Instruments, *ICEMI '2009*, pp. 1-145 through 1-150.
Camps et al., "Numerical Calibration for 3-Axis Accelerometers and Magnetomors," *IEEE*, 2009, pp. 217-231.
"Honeywell 3-Axis Digital Compass IC, HMC5843 Electronic Compass," Honeywell International Inc. [online]; retrieved from the Internet: <URL: http://www.honeywell.com/sites/portal?smap=aerospace&page=Magnetic-Sensors3&theme=T15&catID=CF84B17AB-A9OF-716D-10BC-A1E75441138E&id=HF916B4E0-4F71-9DB5-DFA8-51B1944918EE&sel=2&sel4=1>, retrieved on Jun. 5, 2005, 1 page.
Westerberg, "Compass Go," Apple Apps Store, Oct. 10, 2008, 3 pages.
Moore et al., "Calibrating Sensor Measurements on Mobile Devices," U.S. Appl. No. 12/886,494, filed Sep. 20, 2010.
Piemonte et al., "Determining Heading Using Magnetometer Data and angular Rate Data", U.S. Appl. No. 12/886,531, filed Sep. 20, 2010.
Tu, "Magnetometer Calibration," U.S. Appl. No. 12/899,392, filed Oct. 6, 2010.
Mayor et al., Magnetometer Accuracy and Use, U.S. Appl. No. 13/669,403, filed Nov. 5, 2012.

* cited by examiner

AUTOMATICALLY IDENTIFYING GEOGRAPHIC DIRECTION

TECHNICAL FIELD

This subject matter is related generally to automatically identifying geographic direction.

BACKGROUND

A mobile device such as a cellular phone or a smart phone can be equipped with a magnetometer, a sensor that detects the strength and/or direction of a magnetic field. The magnetometer can be used along with other sensors, such as an accelerometer that senses orientation and velocity. Sensor readings from the magnetometer and accelerometer can be combined to provide a "heading" or "direction" much like a compass. The heading is typically given relative to a direction towards magnetic north, which can be different from the direction towards the Earth's geographic North pole, i.e., true north. The direction information may be provided for the user's own navigation knowledge, for example, to tell the user a heading relative to the direction of magnetic north while the user is walking or driving in unfamiliar surroundings. The direction information can also be used by a navigation or map application that may be running on the device.

A magnetometer can provide a measure of the magnetic field that is present in the immediate surroundings of the device as a two or three-component vector in a Cartesian coordinate system using a two or three-axis magnetic sensor. The sensed magnetic field can include a contribution from the Earth's geomagnetic field. The contribution from the Earth's geomagnetic field can vary based on space, e.g., geographic location, and time mainly due to complex interactions of an electromagnetic dynamo in the Earth's core.

The direction of magnetic north derived from the sensor readings can be corrected to identify a true north (geographic north) direction. Typically, a user consults a geomagnetic map (e.g., a geomagnetic map provided by the U.S. Geological Survey (USGS)) that shows the relationships between magnetic north and true north for a particular geographic area, where other characteristics of the environment, e.g., temperature can be considered substantially constant. In particular, the geomagnetic map can identify the magnitudes of declination at different locations in the geographic area. After identifying the magnitude of declination at a geographic location, a user can correct the magnetic heading using the magnetic variation (declination).

The correction technique described above is effective but can be time consuming. As the user travels with a mobile device, for example, the magnetic variation can change.

SUMMARY

Automatically identifying a geographic direction (e.g., a heading relative to true north) is disclosed. Responsive to a correction trigger event, geographic position data that identifies a geographic position of the device can be obtained. A magnetic declination based on the geographic position data can be obtained. A magnetic heading of the device can be obtained. A geographic direction based on the magnetic heading and the magnetic declination can be identified without user intervention.

These features allow a user to be presented with a geographic direction relative to true north without the user's interaction, thereby reducing a likelihood of user error. For example, the user does not need to separately identify the magnetic heading, declination, or convention needed to apply the declination to correct the magnetic heading. As another example, a user does not need to adjust declinations, e.g., for a compass reading, until a heading is correct or a map is correctly positioned for a particular location, thereby further reducing the likelihood of user error. In addition, new heading corrections can be automatically identified based on calculating new declination values as the user's location changes, thereby increasing an accuracy and precision of the geographic direction presented to the user.

DETAILED DESCRIPTION

The Earth's Magnetic Field—Overview

Figure 1B:
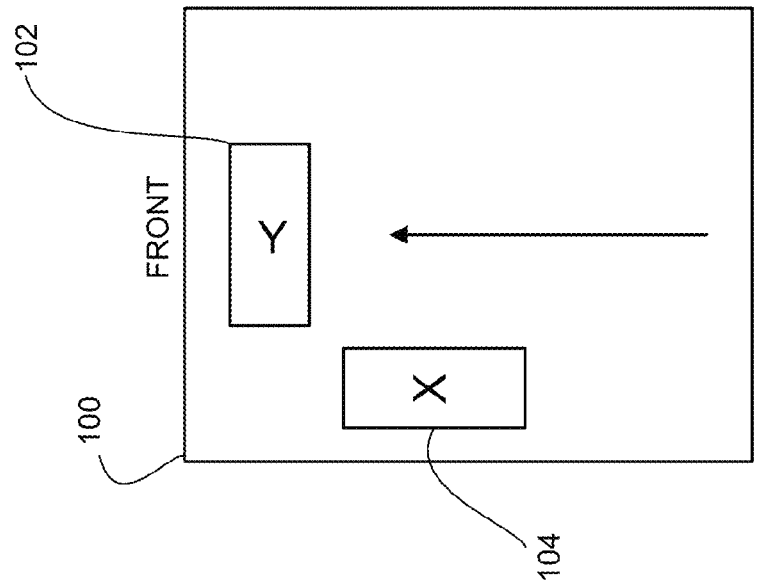
FIG. 1B illustrates an example two-axis magnetometer in accordance with some implementations.
Figure 1A:
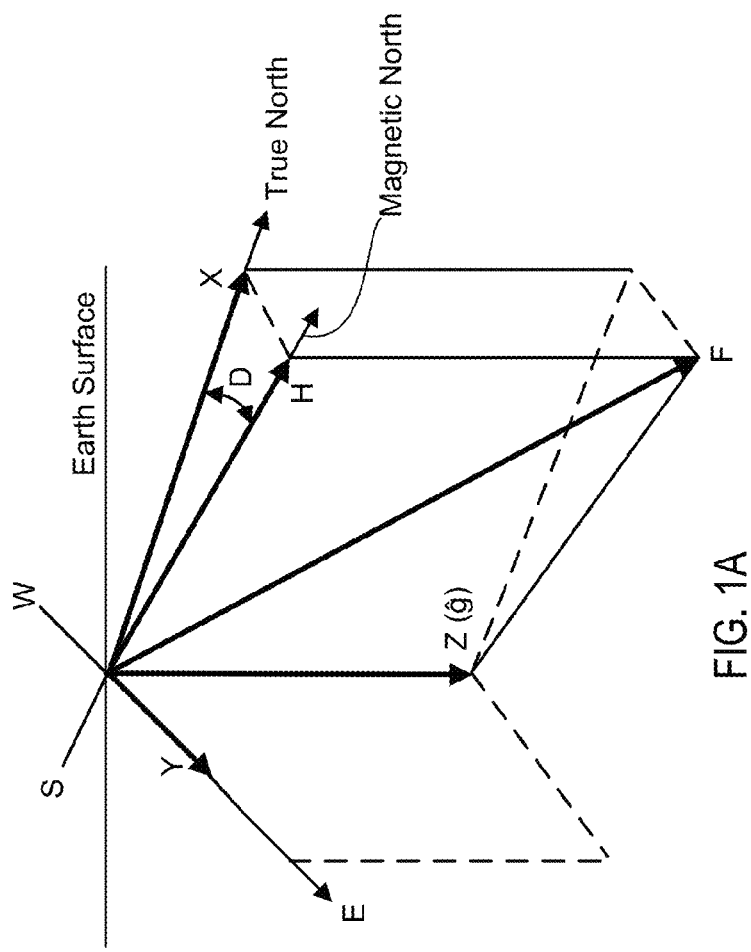
FIG. 1A illustrates an example Cartesian coordinate system describing the Earth's geomagnetic field in accordance with some implementations.

FIG. 1A illustrates an example Cartesian coordinate system for describing the Earth's geomagnetic field in accordance with some implementations. The Earth's geomagnetic field vector $\vec{F}$ can be described by the orthogonal components X (northerly intensity), Y (easterly intensity), and Z (vertical intensity, positive downwards); total intensity F; horizontal intensity H; and declination (or magnetic variation) D. Declination and total intensity can be computed from the orthogonal components using the equations:

$$D = \arctan\left(\frac{Y}{X}\right), \text{ and}$$

$$F = \sqrt{H^2 + Z^2},$$

where H is given by:

$$H = \sqrt{X^2 + Y^2}.$$

FIG. 1B illustrates an example two-axis magnetometer in accordance with some implementations. Magnetometers can be two-axis or three-axis and the processes described here apply equally to both types of sensors. For clarity, only a two-axis magnetometer will be described.

In some implementations, two-axis magnetometer sensor configuration 100 can be used to calculate a magnetic heading for a variety of applications, including applications running on a mobile device. Sensor configuration 100 can include two magnetic field sensors 102 and 104 mounted orthogonally on a board, substrate or other mounting surface. Magnetic sensors 120 and 104 can be included in an integrated circuit (IC) package with or without other sensors, such as accelerometers and gyros.

Sensor configuration 100 can be deployed in a host system environment. Since the Earth's geomagnetic field can vary based on space and time, a procedure can be deployed to identify a particular magnetic variation (declination) at a particular point in space and time that can be used to correct a magnetic heading. One technique is to detect X and Y sensor readings and calculate the declination D.

For this example sensor configuration, sensors 102 and 104 are at right angles with respect to each other and lie level with respect to the Earth's surface. By convention, the positive end of the X-axis points to the North and the positive end of the Y-axis points to the East.

A measurement of the sensor readings can be represented by $(X_E, Y_E)$. In some implementations, a basic calculation of the heading can be performed using $X_E$ and $Y_E$ and the equation:

$$A_{heading} = \arctan(Y_E, X_E),$$

where the resulting heading $A_{heading}$ can be mapped into the correct quadrant based on the signs of $X_E$ and $Y_E$. The heading $A_{heading}$, calculated from measurements provided by the magnetometer, is a magnetic heading that can be corrected by combining the declination with the heading $A_{heading}$ to identify a heading relative to true north.

Other implementations are possible. For example, the heading can also be calibrated based on the orientation of the device obtained from an accelerometer, inclination, and other types of corrections or calibrations.

As a user travels with a mobile device, such as a mobile phone, the declination can change. This could result in the heading correction becoming inaccurate. Periodically, a user can determine a new heading correction based on identifying a new declination from a predictive geomagnetic model such as the World Magnetic Model (WMM) and the International Geomagnetic Reference Field (IGRF). This procedure can be a tedious process for the user if performed often, and may require the user to access the model and correct the heading a number of times.

Example Correction System

Some mobile devices (e.g., an iPhone®) can use positioning technology to determine the mobile device's geographic position (e.g., including a location and a direction). The geographic position of the mobile device can be used to determine the declination at a particular location.

Figure 2:
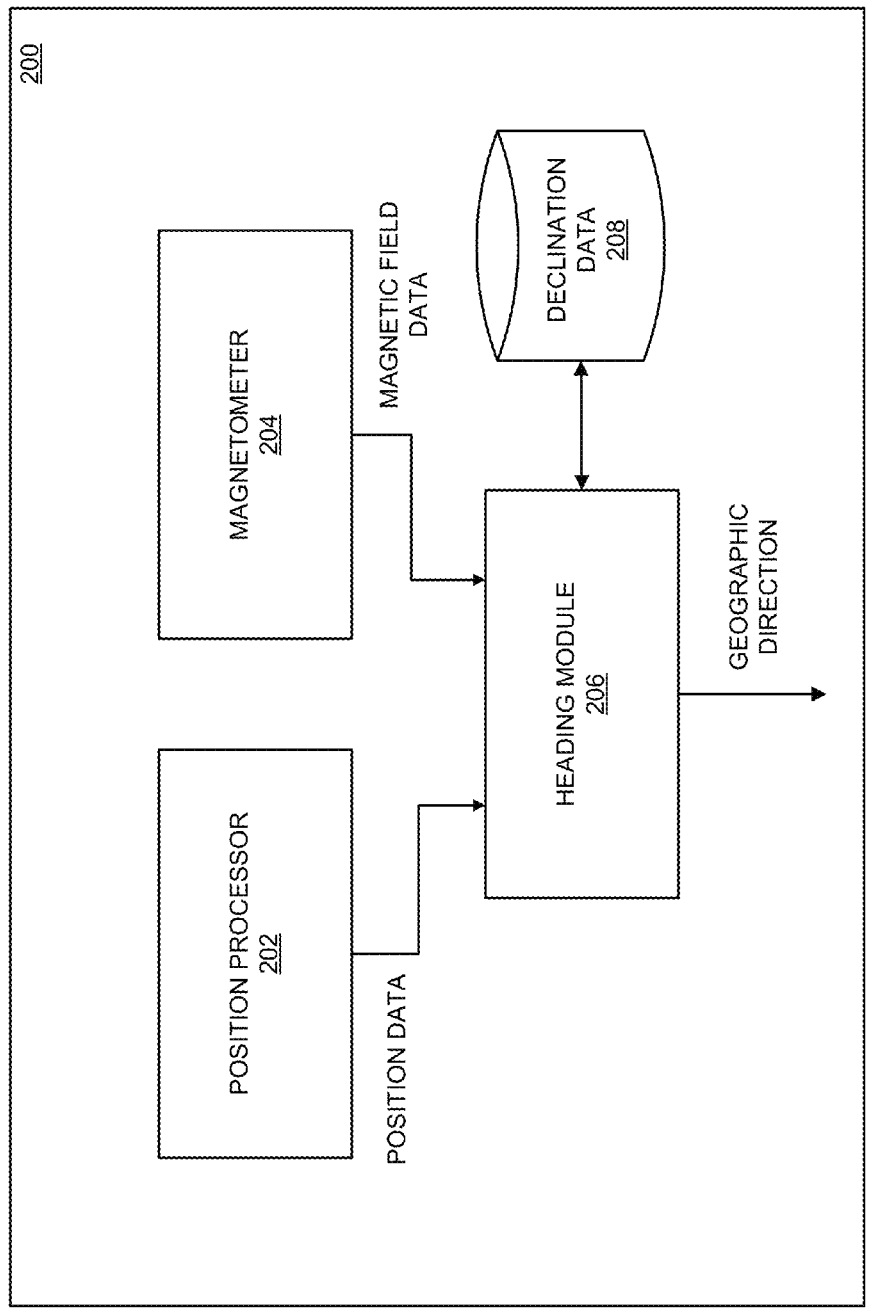
FIG. 2 is a block diagram of example system for automatically identifying a geographic direction in accordance with some implementations.

FIG. 2 is a block diagram of example system 200 for automatically identifying a geographic direction in accordance with some implementations. System 200 can include position processor 202, magnetometer 204, heading module 206 and declination data 208. System 200 can be implemented in software, firmware, hardware or a combination thereof. Position processor 202 can be a Global Positioning System (GPS) receiver or some other processor or receiver for implementing cell tower positioning technology or a Wi-Fi positioning technology (e.g., Skyhook™). Magnetometer 204 can be a two-axis or three-axis magnetic sensor. Heading module 206 can be software that receives position data and magnetic field data from position processor 202 and magnetometer 204, respectively. Some examples of magnetic field data include the data described in reference to FIGS. 1A and 1B. Declination data 208 includes declination magnitudes and corresponding geographical positions and times stored in a map, diagram, table, model or other repository (e.g., on a network server) for subsequent search and retrieval. In some implementations, declination data 208 can be updated periodically, without user intervention. For example, a geomagnetic model can be automatically downloaded from the USGS web site to update declination data 208, e.g., when a new model is available or every year.

In some implementations, system 200 can respond to a correction trigger event. A correction trigger event can be any event that triggers a correction procedure on the mobile device. The trigger event can be based on time, location, mobile device activity, an application request, magnetic field data, etc. As a particular example, the trigger event can be based on a mobile device's movement. The mobile device can include an accelerometer, for example, that measures the mobile device's velocity or speed. Based on the velocity (or an average velocity), a trigger event can occur at predetermined time periods. For example, if the mobile device is moving at an average velocity of 10 miles per hour, a trigger event can occur every 30 minutes so that a new declination is determined every 5 miles.

Responsive to the trigger event, position processor 202 determines a current position of the mobile device. Magnetometer 204 can provide various parameters (e.g., X, Y, and F) related to the Earth's magnetic field which can be used to calculate the heading. In addition, declination D can be determined from declination data 208 based on position data. Once these parameters are determined, one or more of the parameters (collectively referred to as "magnetic field data") and declination data 208 can be used by heading module 206 to identify a magnetic declination and magnetic heading, and correct the magnetic heading using the declination to provide a geographic direction, as described with reference to FIG. 3.

Example Process For Automatically Identifying a Geographic Direction

Figure 3:
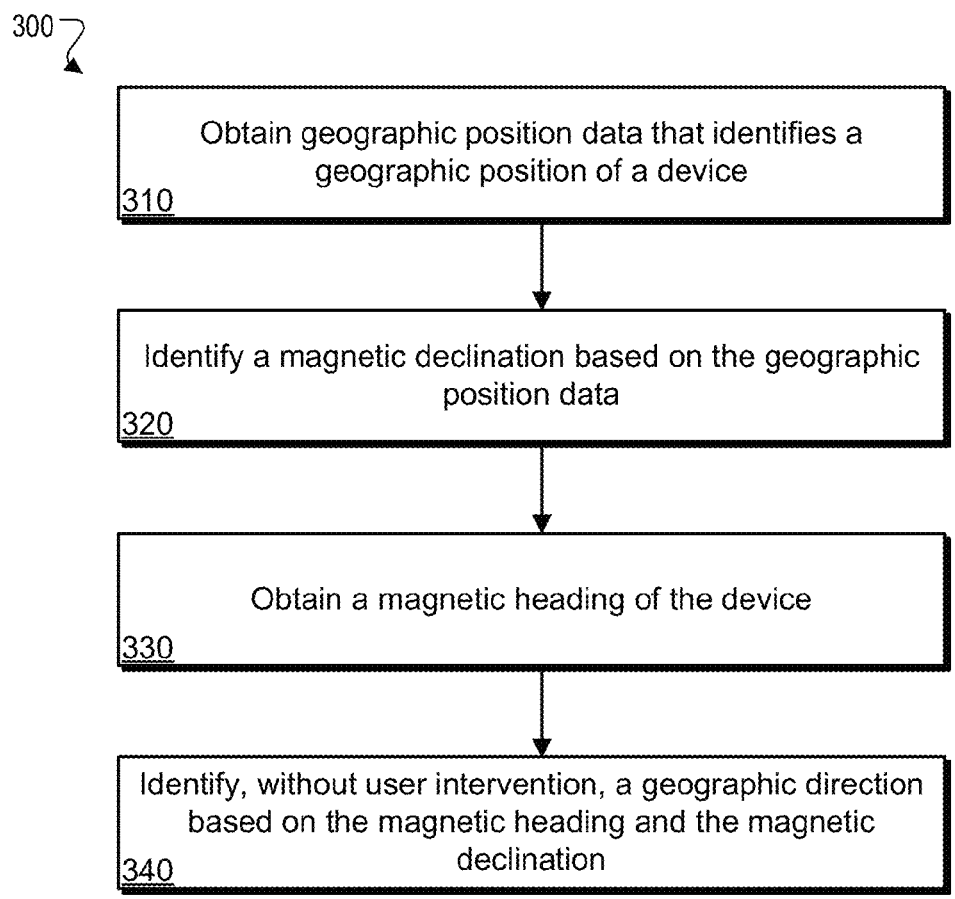
FIG. 3 is a flow diagram of an example process for automatically identifying a geographic direction in accordance with some implementations.

FIG. 3 is a flow diagram of an example process 300 for automatically identifying a geographic direction in accordance with some implementations. Process 300 includes obtaining geographic position data that identifies a geographic position of a device (310). For example, a mobile device can communicate to one or more network access points (e.g., Wi-Fi base station devices) or one or more cell towers. In some implementations, the access points can be any combination of 802.11b/g wireless routers, 802.11n wireless routers, and some other Wi-Fi devices that implement any suitable Wi-Fi or other wireless networking technology or protocol (e.g., GPS protocol). Using the communication with the access points or the cell towers, a location-based service can estimate geographic areas where the mobile device is currently located. Position processor 202 can obtain geographic position data from the location-based service.

Process 300 also includes identifying a magnetic declination based on the geographic position data (320). For example, heading module 206 can identify the magnetic declination based on geographic position data provided by position processor 202. In particular, heading module 206 can obtain declination data 208 to identify the magnetic declination. In some implementations, declination data 208 can be represented in the form of a geomagnetic model, such as in a WMM model or an IGRF model. The geomagnetic model can provide magnetic field components X, Y, D, and F. In these and other implementations, the magnetic field components can be used to identify both the magnetic declination and the magnetic heading.

Other implementations are possible. For example, declination data 208 can be stored in a table. For example, the table can include rows corresponding to particular geographic positions. One or more geographic positions can be associated with corresponding magnetic field components for different dates and times. Because the Earth's magnetic field can fluctuate throughout seasons of a year, or even throughout a single day, due to solar radiation, for example, different magnetic field components can be used to calculate the magnetic declination based on a season (e.g., spring, summer, autumn, winter) or period of time (e.g., morning, afternoon, evening) that corresponds to temporal data. System 200 can obtain temporal data that is related to the geographic position data and that identifies a time. For example, the current time at the particular geographic position can be identified. The geographic position and the time can then be used to search for a magnitude of magnetic declination, in declination data 208, that corresponds to the time and the geographic position.

Process 300 also includes obtaining a magnetic heading of the device (330). In some implementations, the magnetic heading of the device can be obtained based on measurements from magnetometer 204 as described previously with respect to FIGS. 1A and 1B. In particular, the following equations can be used to calculate $A_{heading}$ based on the measurements of X and Y:

$$A_{heading} = 90 - \arctan\left(\frac{X}{Y}\right) * \frac{180}{\pi}, \text{ if } Y > 0,$$

$$A_{heading} = 270 - \arctan\left(\frac{X}{Y}\right) * \frac{180}{\pi}, \text{ if } Y < 0,$$

$$A_{heading} = 180.0, \text{ if } Y = 0 \text{ and } X < 0, \text{ and}$$

$$A_{heading} = 0.0, \text{ if } Y = 0 \text{ and } X > 0.$$

Process 300 also includes identifying, without user intervention, a geographic direction based on the magnetic heading and the magnetic declination (340). The geographic direction is automatically identified without user intervention. Typically, a user could determine the geographic direction by identifying a declination on an isogonic chart and manually adding or subtracting the declination from a heading provided by a magnetic compass, for example, by adjusting a bezel on the compass. However, some compasses do not include an adjustable bezel for performing declination compensations and require a user to determine whether to add or subtract the declination from the magnetic heading. For example, the user must know or determine that a declination of 8 degrees West indicates that magnetic north lies 8 degrees counter-clockwise from true north. As another example, the user must know or determine that −8 degrees indicates that magnetic north lies 8 degrees counter-clockwise from true north, and +8 degrees indicates that magnetic north lies 8 degrees clockwise from true north. In both situations, the additional user interaction increases the likelihood of user error.

Process 300 can automatically, e.g., without user intervention, identify the geographic direction. For example, using declination data 208, heading module 206 can automatically identify the magnetic declination (based on geographic position data) and add or subtract, as appropriate, the magnetic declination from the magnetic heading identified based on magnetic data provided by magnetometer 204. In fact, in some implementations, process 300 can include other combinations of one or more of steps 310, 320, 330, and 340 performed automatically, e.g., without user intervention, thereby further reducing an amount of user interaction and the likelihood of user error.

Example Interfaces

Figure 4:
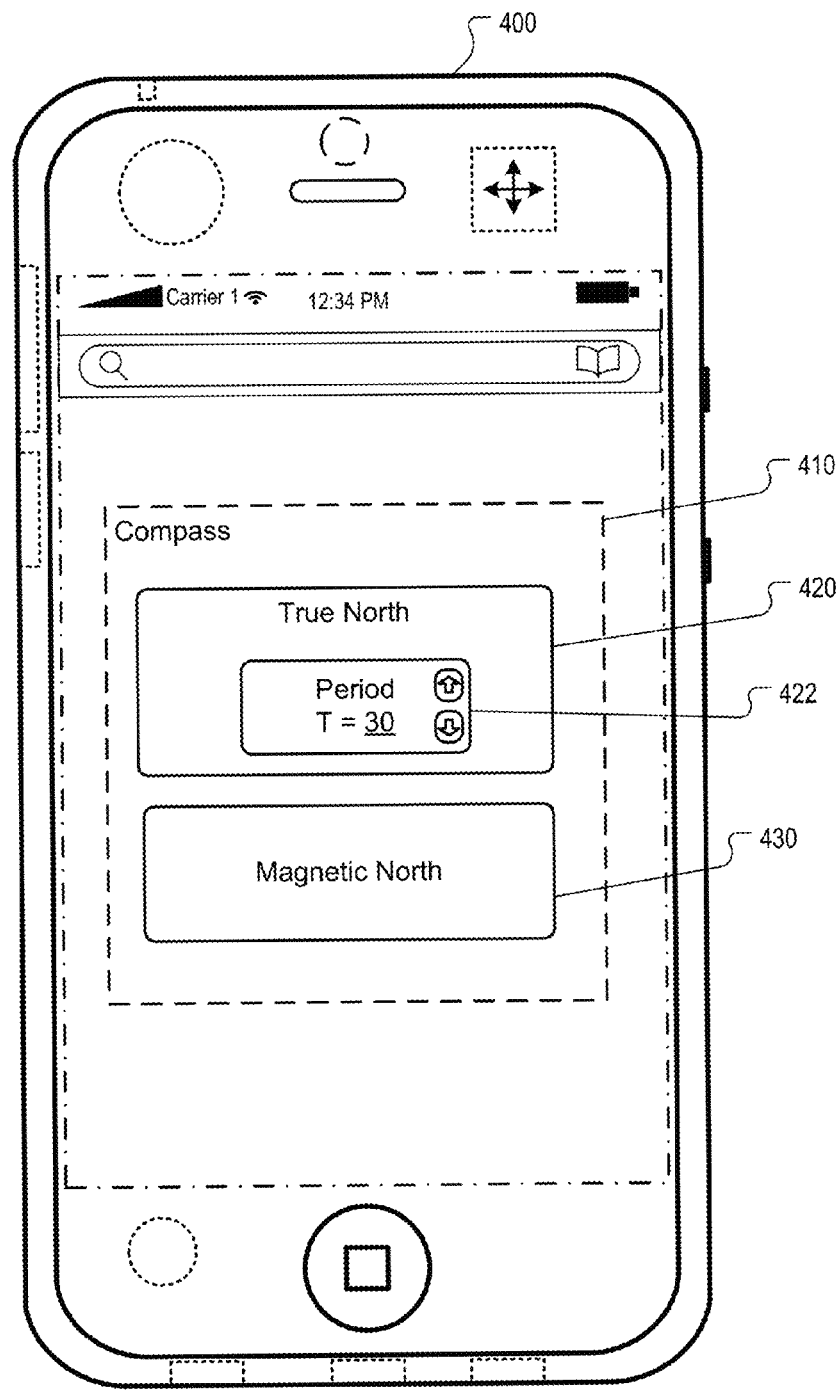
FIG. 4 illustrates an example user interface for specifying preferences.

FIG. 4 illustrates an example user interface 410 for specifying preferences. Preferences that can be specified by a user can include, for example, selecting a type of direction to be presented. A user can select (e.g., touch) interface element 420 to indicate a preference that information related to directions using true north be displayed. In addition, the user can use interface element 422 to specify a period of time that is used to determine how often a heading correction is identified. In the particular example, "T=30" can indicate that a new heading correction is identified every 30 minutes. Furthermore, the user can select interface element 430 to indicate a preference that information related to directions using magnetic north be displayed.

Other implementations are possible. For example, additional interface elements can be used to present an option to show a heading relative to true north at a particular time in the past or the future. In particular, declination data 208 can be obtained from the $10^{th}$ Generation IGRF that can provide magnetic field components for dates in years ranging from 1900 to 2015. As other examples, additional interface elements can be used to set preferences to default values, to modify preferences that have already been set, and to present other modifiable preferences such as, but not limited to preferences to use other techniques (e.g., GPS) to identify or correct the direction.

Figure 5:
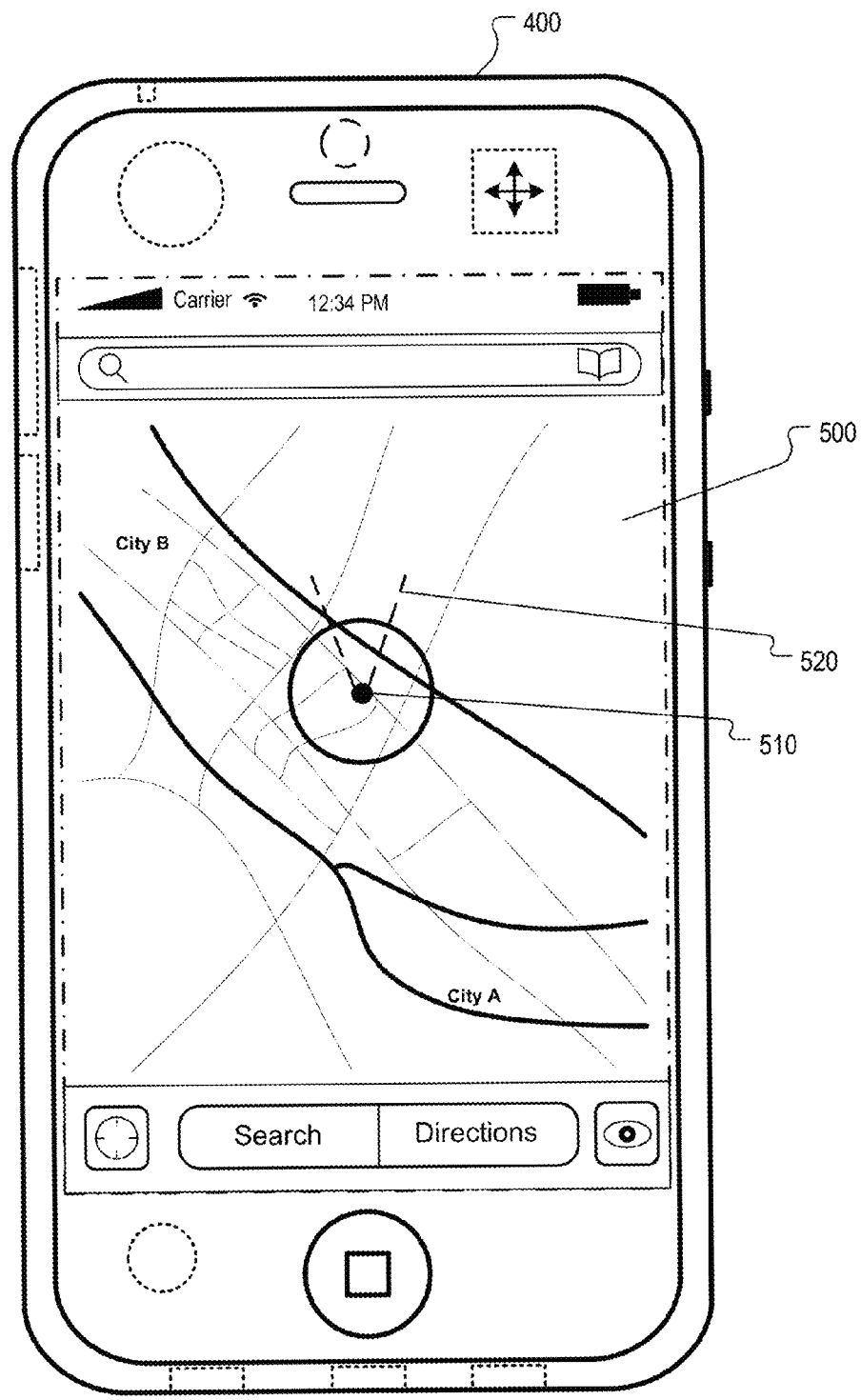
FIG. 5 illustrates an example map display for showing a direction

FIG. 5 illustrates an example map display 500 for showing a direction. In particular, the direction is represented in a map by placemark 510. The direction, or heading, of device 400 can be represented by indicator 520. In this particular example, indicator 520 is represented by a cone-shaped beam, much like that of a flashlight's beam, to indicate the direction that device 400 is pointed or moving. Other implementations are possible. For example, indicator 520 can be shown using other representations such as, but not limited to arrows or other forms of pointers. In addition, animations can also be used to indicate the direction, e.g., placemark 520 can be animated such that it looks like placemark 520 is jumping back and forth between a current position and a next position located in a path of the direction. The type of graphical representation used to represent placemark 510 and indicator 520 can be specified according to user preference.

Figure 6:
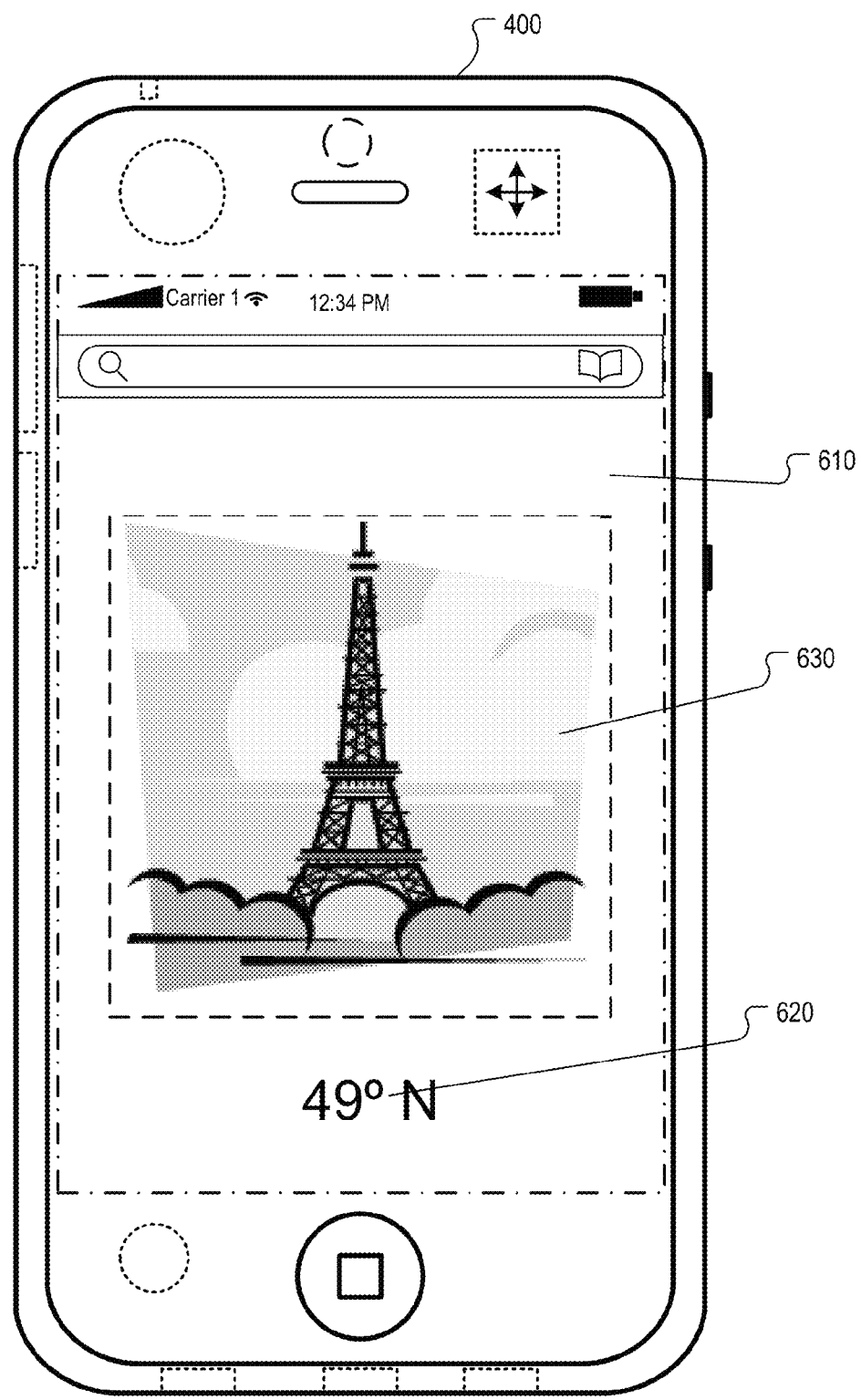
FIG. 6 illustrates an example heading display for showing a direction.

FIG. 6 illustrates an example heading display 610 for showing a direction. In particular, the direction is represented by geographic direction 620, i.e., 49 degrees North. In some implementations, the representation of the geographic direction includes content 630 that identifies a physical location. In this particular example, a user could be standing in Paris, France and be holding device 400 such that it is pointing in the direction of 49 degrees North. In response, device 400 could present content 630. Content 630 is an image that identifies the Eiffel Tower, which is located at approximately 48.85 degrees North and 2.29 degrees East. Other implementations are possible. For example, the content can be audio, video, or text. Returning to the example, device 400 could play a sound clip that states "Eiffel Tower at 48 degrees North". As another example, device 400 could present a video of the Eiffel Tower or the text "Eiffel Tower", instead of or in combination with the image. Furthermore, a user could point device 400 in other directions, and device 400 could present content 630 that identifies other landmarks or major cities, e.g., outside of Paris, France, such as the Statue of Liberty in New York City at approximately 40.69 degrees North and 74.04 degrees West.

Example Mobile Device Architecture

Figure 7:
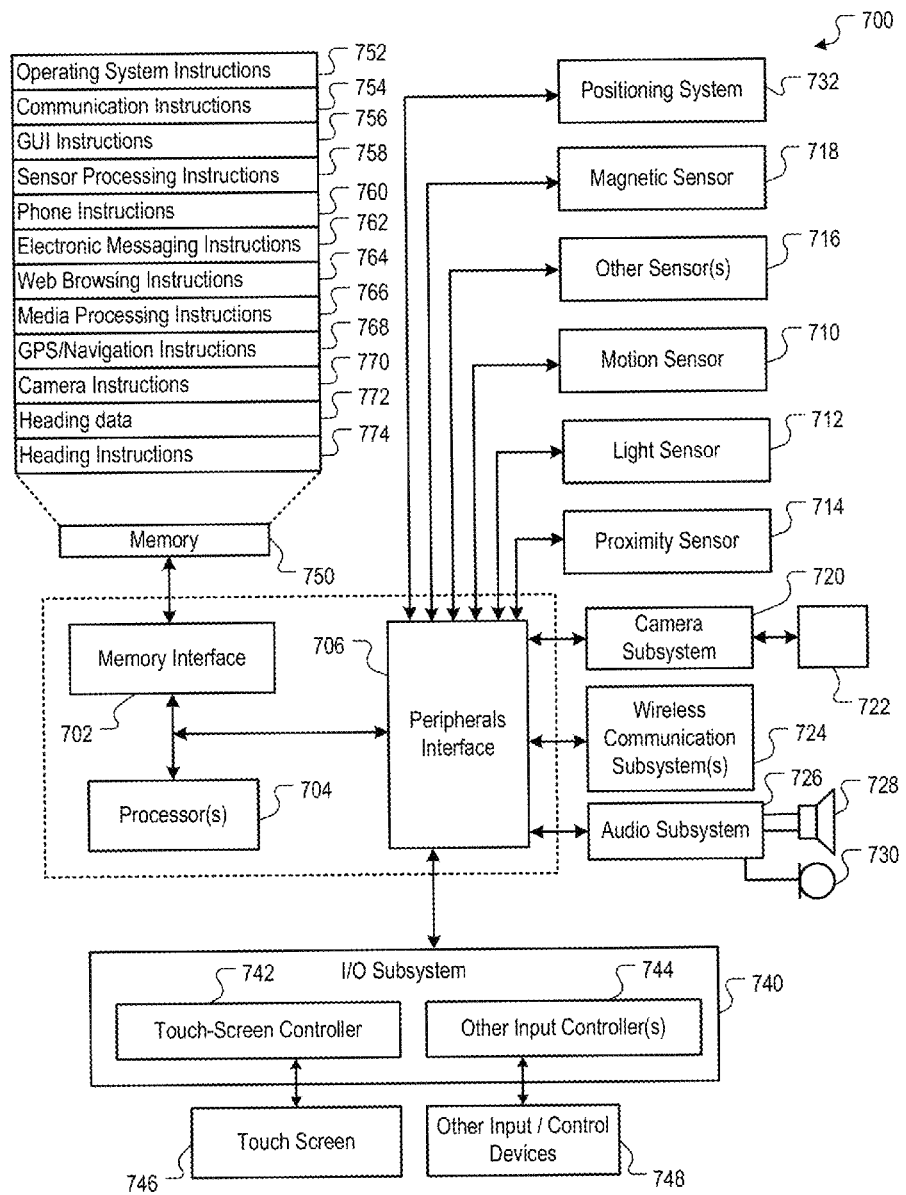
FIG. 7 is a block diagram of example architecture of a mobile device employing the process of FIG. 3 in accordance with some implementations.

FIG. 7 is a block diagram of example architecture of a mobile device 700 employing the process of FIG. 3 in accordance with some implementations. Mobile device 700 can include memory interface 702, one or more data processors, image processors and/or central processing units 704, and peripherals interface 706. Memory interface 702, one or more processors 704 and/or peripherals interface 706 can be separate components or can be integrated in one or more integrated circuits. Various components in mobile device architecture 700 can be coupled together by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Positioning system 732 (e.g., a GPS receiver including position processor 202) can be connected to peripherals interface 706 to provide geopositioning. Magnetic sensor 718 (e.g., an integrated circuit chip including magnetometer 204) can also be connected to peripherals interface 706 to provide magnetic field data. Other sensor(s) 716 can include sensors such as an accelerometer. As described previously magnetic sensor 718 can be used in conjunction with other sensor(s) 716, e.g., an accelerometer, to determine the direction of magnetic north or a geographic direction much like a compass.

Camera subsystem 720 and optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of wireless communication subsystem 724 can depend on the communication network(s) over which the mobile device is intended to operate. For example, the mobile device may include communication subsystems 724 designed to operate over a GSM network, a GPRS network, an EDGE network, a Wi-Fi or WiMax network, and a Bluetooth™ network. In particular, wireless communication subsystems 724 may include hosting protocols such that the mobile device may be configured as a base station for other wireless devices.

Audio subsystem 726 can be coupled to speaker 728 and microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to touch screen 746. Touch screen 746 and touch screen controller 742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, docking station and/or a pointer device such as a stylus. The one or more buttons (not shown) can include an up/down button for volume control of speaker 728 and/or microphone 730.

In one implementation, a pressing of the button for a first duration may disengage a lock of touch screen 746; and a pressing of the button for a second duration that is longer than the first duration may turn power to the mobile device on or off. The user may be able to customize a functionality of one or more of the buttons. Touch screen 746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod Touch™.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can be a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; heading data 772 (e.g., declination data 208) and heading instructions 774 for heading module 206, for example, to facilitate automatically identification of a geographic direction, as described with reference to FIG. 3. In some implementations, GUI instructions 756 and/or media processing instructions 766 implement the features and operations described in reference to FIGS. 1-6.

Memory 750 may also store other software instructions (not shown), such as web video instructions to facilitate web video-related processes and functions; and/or web shopping instructions to facilitate web shopping-related processes and functions. In some implementations, media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A device comprising:
   one or more processors; and
   memory coupled to the one or more processors and storing instructions which, when executed by the one or more processors, are configured to cause the one or more processors to perform operations comprising:
   presenting, on a user interface shown on a display coupled to the device, a first user interface element that provides an option to a user to select one of a magnetic direction or a geographic direction to be shown on the device;
   presenting, on the user interface, a second user interface element that is associated with the first user interface element and is configured to allow the user to input a time period at which heading correction is identified;
   obtaining periodically, based on user inputs corresponding to the first and second user interface elements, geographic position data that identifies a current geographic position of the device;
   examining, using the geographic position data, declination data that is pre-stored in the device;
   responsive to examining the declination data, identifying a magnetic declination at the current geographic position of the device;
   obtaining a magnetic heading of the device; and
   identifying, without user intervention, a geographic direction of the device based on the magnetic heading and the magnetic declination.

2. The device of claim 1, wherein the instructions are configured to cause the one or more processors to perform operations comprising:
   presenting, on the display coupled to the device, content associated with one or more landmarks that are located in the identified geographical direction.

3. The device of claim 2, wherein the content comprises one of an audio recording identifying the one or more landmarks located in the identified geographical direction, a video recording identifying the one or more landmarks located in the identified geographical direction, or a graphical image identifying the one or more landmarks located in the identified geographical direction.

4. The device of claim 1, comprising a magnetometer, where the magnetic heading is obtained based on measurements made by the magnetometer.

5. The device of claim 1, where the instructions that cause the one or more processors to perform operations comprising identifying the magnetic declination includes instructions that cause the one or more processors to perform operations comprising:
   identifying from the declination data, a magnitude of a first magnetic declination that corresponds to the geographic position.

6. The device of claim 1, where the declination data is stored in the memory.

7. The device of claim 1, where the declination data is represented in a geomagnetic model that is configured to provide magnetic field components used to identify the magnetic declination and the magnetic heading.

8. The device of claim 1, where the instructions are configured to cause the one or more processors to perform operations comprising:
   periodically downloading in the device a geomagnetic model from a predetermined network location; and
   updating the declination data that is pre-stored in the device using the geomagnetic model that is downloaded from the predetermined network location.

9. The device of claim 1, comprising instructions that cause the one or more processors to perform operations including:
   obtaining temporal data that is related to the geographic position data and identifies a time of day at which the temporal data is obtained;
   examining the declination data that is pre-stored in the device using the geographic position data and the identified time of day; and
   responsive to examining the declination data, determining a magnitude of the magnetic declination that corresponds to the current geographic position and the identified time of day.

10. The device of claim 1, wherein the instructions that are configured to cause the one or more processors to perform operations comprising obtaining geographic position data include instructions that are configured to cause the one or more processors to perform operations comprising:
    measuring a speed at which the device is moving;
    computing an average speed of the device based on the measured speed;
    obtaining a predetermined time period corresponding to the computed average speed; and
    identifying the magnetic declination and identifying, without user intervention, the geographic direction, periodically based on the predetermined time period.

11. The device of claim 1, comprising instructions that cause the one or more processors to perform operations comprising:
    displaying, on a user interface associated with the device, an indicator identifying the geographic direction, where the indicator is overlaid on a map for marking the current geographic position of the device.

12. A computer-implemented method, comprising:
    presenting, on a user interface shown on a display coupled to a device, a first user interface element that provides an option to a user to select one of a magnetic direction or a geographic direction to be shown on the device;
    presenting, on the user interface, a second user interface element that is associated with the first user interface element and is configured to allow the user to input a time period at which heading correction is identified;
    obtaining periodically, based on user inputs corresponding to the first and second user interface elements, geographic position data that identifies a current geographic position of the device;
    examining, using the geographic position data, declination data that is pre-stored in the device;
    responsive to examining the declination data, identifying a magnetic declination at the current geographic position of the device;
    obtaining a magnetic heading of the device; and
    identifying, without user intervention, a geographic direction of the device based on the magnetic heading and the magnetic declination.

13. The method of claim 12, comprising:
    presenting, on the device, content associated with one or more landmarks that are located in the identified geographical direction.

14. The method of claim 13, wherein the content comprises one of an audio recording identifying the one or more landmarks located in the identified geographical direction, a video recording identifying the one or more landmarks located in the identified geographical direction, or a graphical image identifying the one or more landmarks located in the identified geographical direction.

15. The method of claim 12, comprising:
presenting an indicator of the geographic direction on a user interface associated with the device, where the indicator is overlaid on a map for marking the current geographic position of the device.

16. The method of claim 12, where the magnetic heading is obtained based on measurements made by one of a compass or a magnetometer.

17. The method of claim 12, where identifying the magnetic declination includes:
identifying from the declination data, a magnitude of a first magnetic declination that corresponds to the geographic position.

18. The method of claim 12, where the declination data is represented in a geomagnetic model that is configured to provide magnetic field components used to identify the magnetic declination and the magnetic heading.

19. The method of claim 12, comprising:
periodically downloading in the device, without user intervention, a geomagnetic model from a predetermined network location; and
updating, without user intervention, the declination data that is pre-stored in the device using the geomagnetic model that is downloaded from the predetermined network location.

20. The method of claim 12, comprising:
obtaining temporal data that is related to the geographic position data and identifies a time of day at which the temporal data is obtained;
examining the declination data that is pre-stored in the device using the geographic position data and the identified time of day; and
responsive to examining the declination data, determining a magnitude of the magnetic declination that corresponds to the current geographic position and the identified time of day.

21. The method of claim 12, wherein obtaining geographic position data comprises:
measuring, a speed at which the device is moving;
computing an average speed of the device using the measured speed;
selecting a predetermined time period corresponding to the computed average speed; and
identifying the magnetic declination and identifying, without user intervention, the geographic direction periodically based on the predetermined time period.

* * * * *

UNITED STATES PATENT AND TRADEMARK OFFICE
CERTIFICATE OF CORRECTION

PATENT NO. : 8,898,034 B2  
APPLICATION NO. : 12/477865  
DATED : November 25, 2014  
INVENTOR(S) : Ronald Keryuan Huang et al.

Page 1 of 1

It is certified that error appears in the above-identified patent and that said Letters Patent is hereby corrected as shown below:

On the Title Page

Page 2 (OTHER PUBLICATIONS), column 1, line 6, delete "Magenetic" and insert -- Magnetic --, therefor.

Page 2 (OTHER PUBLICATIONS), column 2, line 36, delete "Magnetomors" and insert -- Magnetometers --, therefor.

Page 2 (OTHER PUBLICATIONS), column 2, line 43, delete "retireved" and insert -- retrieved --, therefor.

In the Claims

In claim 21, column 14, line 17, delete "measuring," and insert -- measuring --, therefor.

Signed and Sealed this
Fourteenth Day of April, 2015

Michelle K. Lee
*Director of the United States Patent and Trademark Office*